United States Patent [19]

Arimatsu

[11] 4,422,987
[45] Dec. 27, 1983

[54] METHOD FOR VULCANIZING AN ELASTOMER

[75] Inventor: Toshio Arimatsu, Akashi, Japan

[73] Assignee: Sumitomo Rubber Industries, Ltd., Kobe, Japan

[21] Appl. No.: 321,929

[22] Filed: Nov. 16, 1981

[30] Foreign Application Priority Data

Jul. 24, 1981 [JP] Japan .............................. 56-116644

[51] Int. Cl.³ .............................................. B29H 5/01
[52] U.S. Cl. .................................. 264/40.1; 264/40.3; 264/40.6
[58] Field of Search ...................... 264/40.1, 40.3, 40.6

[56] References Cited

U.S. PATENT DOCUMENTS

| | | | |
|---|---|---|---|
| 4,027,543 | 6/1977 | Johnston | 264/85 |
| 4,097,565 | 6/1978 | Cole et al. | 264/40.3 |
| 4,143,114 | 3/1979 | Smith et al. | 264/40.1 |
| 4,233,259 | 11/1980 | Pietratus et al. | 264/167 |
| 4,344,142 | 8/1982 | Diehn et al. | 264/40.1 |

*Primary Examiner*—Maurice J. Welsh
*Attorney, Agent, or Firm*—Wenderoth, Lind & Ponack

[57] ABSTRACT

The invention relates to a method for vulcanizing an elastomer, such as tire, fender, sleeve, hose, etc., set in a vulcanizing chamber by use of a mixed fluid comprising a low enthalpy gas and a high thermal capacity thermal fluid, said mixed fluid being obtained by introducing said gas and fluid each independently into the vulcanizing chamber for direct mixing in said vulcanizing chamber, the temperature, pressure and flow rate necessitated for the vulcanization of the vulcanizable elastomer being adapted to be controlled by a temperature sensor and a pressure sensor provided inside the vulcanizing chamber thereby making it possible to obtain proper vulcanization without the conventional impediments of surface bareness or imperfect adhesion in the part of the carcass due to insufficient exhaust in air.

3 Claims, 1 Drawing Figure

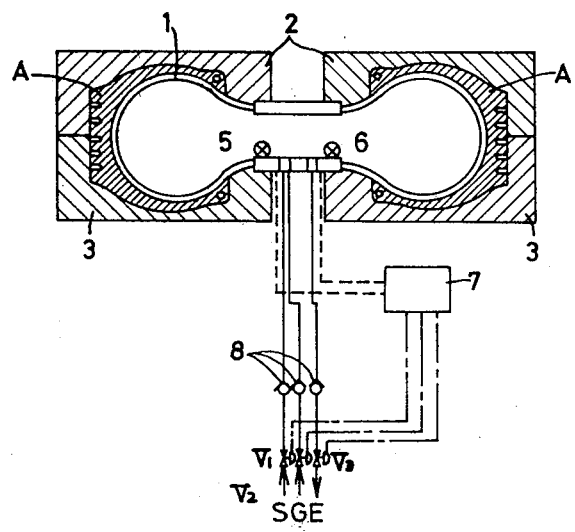

METHOD FOR VULCANIZING AN ELASTOMER

The invention relates to a method for vulcanizing an elastomer, and more particularly to a method for vulcanizing an elastomer set in a vulcanizing chamber by use of a mixture of a high pressure low enthalpy gas and a low pressure high thermal capacity thermal fluid.

Elastomers have heretofore been vulcanized by various methods. Particularly, the so-called gas vulcanization method was proposed in Patent Laid-Open Gazette No. SHO-51-64579.

According to the method, a vulcanizable elastomer placed in a vulcanizing chamber is subjected to a first and a second processes, in the first process the elastomer being hardened by supplying a relatively low pressure high thermal capacity thermal fluid, for example, steam, in the second process the vulcanization of said elastomer being completed by introducing a low enthalpy gas of higher pressure than that of said thermal fluid.

This method, however, has a disadvantage in that fully satisfactory hardening is not obtainable since there is a limit to the control of the pressure and temperature of the relatively low pressure high thermal capacity thermal fluid supplied in the first process for hardening the elastomer.

To be more precise, since saturated steam is generally used as a high thermal capacity fluid, the conventional method has the following disadvantages due to proportional interrelation existing between the temperature and the pressure. (1) If the temperature is held proper, the pressure is excessively reduced thereby making it impossible to satisfactorily exhaust the air accumulated between the metal molds and the elastomer to be vulcanized. Thus there is a tendency that bareness arises on the surface of the vulcanized elastomer and imperfect adhesion occurs in the part of the carcass. (2) If the pressure is held proper, the temperature is excessively elevated. Thus the elastomer is overvulcanized resulting in deterioration of rubber or cord.

The invention has been made as a result of a series of tests to eliminate the aforedescribed disadvantages involved in the conventional method of gas vulcanization. The invention enables one to accomplish proper vulcanization without surface bareness at low cost by use of a mixed fluid comprising a low enthalpy gas and a high thermal capacity thermal fluid, e.g., steam, directly mixed in the vulcanizing chamber and controlled to an optical temperature and pressure.

The invention will hereinunder be described in detail in reference to the accompanying drawings.

The FIGURE is a diagram showing an embodiment of the vulcanization method according to the invention, wherein a tire (A) is used as an example of vulcanizable elastomers. The FIGURE shows the state in which vulcanization of said tire (A) set in the vulcanizing chamber or metal molds with interposition of a bladder has made a considerable progress.

Referring to the FIGURE, the numeral 1 designates a bladder with its outer periphery inflated by the supply of fluid, 2 designating an upper metal mold, 3 designating a lower metal mold.

The tire (A) is interposed between the bladder 1 and the metal molds 2,3.

The low enthalpy gas (G) and the high thermal capacity thermal fluid (S) are supplied directly into the vulcanizing chamber (the bladder 1 or the tire (A)), said two fluids being mixed in said vulcanizing chamber. The numerals 5 and 6 designate a pressure sensor and a temperature sensor provided in the vulcanizing chamber respectively, 7 designating a controller with a microcomputer incorporated therein.

The numeral 8 designates a check valve, $V_1, V_2, V_3$ designating automatic control valves provided in the pipes of the steam (S), gas (G) and exhaust (E), respectively.

The low enthalpy gas (G) and the high thermal capacity thermal fluid (S) mixed in the vulcanizing chamber are made into a mixed fluid of an optional temperature and pressure with the pressure sensor 5 and the temperature sensor 6 provided in the vulcanizing chamber continuously detecting the pressure and temperature. Since the pressure and temperature conditions suitable for vulcanization of the elastomer are preliminarily stored in the controller 7, said controller 7 controls the flow rate of the steam and the gas or exhaust said fluids by operating the automatic control valve respectively so that properly mixed fluid can be obtained in the vulcanizing chamber in conformity with said conditions.

The invention will hereinunder be described in more detail in reference to the case in which the vulcanizable elastomer is, for example, a tire of the size of 1000-20.

The conditions of vulcanizing a tire of the size of 1000-20 are within the range of the temperature 140°–200° C. and the pressure 15–30 kg/cm. For example, the conditions of 170° C. and 28 kg/cm are preliminarily stored in the controller 7, a raw tire being set in the metal molds, the automatic control valves $V_1, V_2$ being opened while the automatic control valve $V_3$ is closed, thereby supplying steam (S) and gas (G) into the metal molds to obtain a mixed fluid.

Thus the vulcanization starts. In course of the heat treatment by means of said mixed fluid, the pressure and temperature of the mixed fluid are continuously entered as inputs into the controller thereby enabling said controller to control the apertures of the automatic control valves of the steam and gas $V_1, V_2$ in conformity with said conditions of 170° C.-28 kg/cm$^2$.

The control in case of excess or deficiency of the pressure and temperature of the mixed fluid is effected as follows. If the temperature alone is short of the standard level, the valves $V_1, V_2$ and $V_3$ are opened, while if the pressure is higher than the standard level and the temperature is short of the standard level, the valve $V_3$ is first opened to discharge the mixed fluid, said valve $V_3$ being subsequently closed, the valves $V_1, V_2$ being then opened thereby supplying the steam and the gas.

If the pressure alone is short of the standard level, the valve $V_2$ is opened with the valves $V_1, V_3$ remaining closed so that the gas may be supplied into the vulcanizing chamber in large amount.

The vulcanization (the vulcanizing process) of the tire is completed by supplying thereto a mixed fluid of the aforesaid conditions for 40–50 minutes.

The same is applicable to the case in which vulcanization is effected without interposition of the bladder.

After the heat treatment, the automatic control valve $V_3$ communicating with the exhaust port is opened, while the steam and gas control valves $V_1, V_2$ are closed, so as to discharge the mixed fluid. Thus the heat treatment is completed.

The whole vulcanizing process is completed through the conventionally known steps, such as water cooling process and the like.

The elastomers vulcanizable by the method according to the invention comprise fenders, sleeves, hoses, etc., in addition to tires described in the embodiment of the invention.

As described hereinbefore, the vulcanization method according to the invention is characterized in that the elastomer is vulcanized by producing a mixed fluid directly in the vulcanizing chamber and a controller is used in order to set and continuously maintain the pressure and temperature conditions most suitable for the vulcanization thereby enabling to obtain high pressure without permitting the temperature to rise in excess in the initial stage of vulcanization of the elastomer. Thus the invention enables to obviate surface bareness due to excess or deficiency of pressure and temperature and over-vulcanization resulting in deterioration of rubber and cord.

The invention has a further advantage in that the waste of energy can be prevented since the thermal value is continuously controlled in conformity with the predetermined contions.

What is claimed is:

1. In a method for vulcanizing an elastomer set in a vulcanizing chamber by use of a fluid of a low enthalpy gas and a high thermal capacity fluid, the improvement wherein the said gas and thermal fluid are mixed directly in the vulcanizing chamber and controlled under optimal pressure and temperature conditions suitable for vulcanizing the elastomer by means of a controller which operates in response to a pressure sensor and temperature sensor located within the vulcanizing chamber.

2. The improvement according to claim 1 in which optimal pressure and temperature conditions are predetermined and stored in said controller and wherein the vulcanizing chamber contains three separate lines connected to the vulcanizing chamber for (1) supplying said low enthalpy gas, (2) the high thermal capacity fluid and (3) an exhaust line, said lines each provided with automatic control valves, and wherein the automatic control valves which determine the flow rate in each of said lines are controlled by said controller which operates in response to the temperature and pressure sensor within the vulcanizing chamber, as the temperature and pressure deviates from said predetermined vulcanizing conditions.

3. The improvement according to claim 2 in which the high thermal capacity fluid is steam.

* * * * *